(12) United States Patent
Fukuda et al.

(10) Patent No.: US 8,965,912 B2
(45) Date of Patent: Feb. 24, 2015

(54) INTEGRATING DATABASES (75) Inventors: Takeshi Fukuda, Machida (JP); Ryoji Kurosawa, Yokohama (JP); Masahiro Ohkawa, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 1893 days.

(21) Appl. No.: 11/926,504

(22) Filed: Oct. 29, 2007

(65) Prior Publication Data

US 2008/0306904 A1 Dec. 11, 2008

(30) Foreign Application Priority Data

Oct. 30, 2006 (JP) .................................. 2006-294295

(51) Int. Cl.
*G06F 17/30* (2006.01)

(52) U.S. Cl.
CPC .... G06F 17/30557 (2013.01); G06F 17/30545 (2013.01)
USPC .......................................... 707/759; 707/713

(58) Field of Classification Search
USPC ................................ 707/713, 717–719, 759, 707/999.001–999.005
See application file for complete search history.

(56) References Cited

U.S. PATENT DOCUMENTS

| | | | | |
|---|---|---|---|---|
| 5,276,870 | A * | 1/1994 | Shan et al. ......................... | 707/2 |
| 5,864,840 | A * | 1/1999 | Leung et al. ........................... | 1/1 |
| 5,897,632 | A * | 4/1999 | Dar et al. ............................... | 1/1 |
| 5,926,819 | A | 7/1999 | Doo et al. | |
| 5,991,754 | A | 11/1999 | Raitto et al. | |
| 6,205,451 | B1 | 3/2001 | Norcott et al. | |
| 6,345,272 | B1 * | 2/2002 | Witkowski et al. ........... | 707/759 |
| 6,353,818 | B1 * | 3/2002 | Carino, Jr. ......................... | 707/2 |
| 6,496,828 | B1 * | 12/2002 | Cochrane et al. ................ | 707/10 |
| 6,526,403 | B1 * | 2/2003 | Lin et al. ................................ | 1/1 |
| 6,546,381 | B1 * | 4/2003 | Subramanian et al. ........... | 707/2 |

(Continued)

FOREIGN PATENT DOCUMENTS

| | | |
|---|---|---|
| JP | 11126209 | 5/1999 |
| JP | 11-213014 | 8/1999 |

(Continued)

OTHER PUBLICATIONS

Patel, Burzin. "Forcing Query Plans" http://msdn.microsoft.com/en-us/library/cc917694.aspx. Published Nov. 1, 2005. The subject matter disclosed therein pertains to the pending claims (i.e. disabling a plan).*

(Continued)

*Primary Examiner* — Ajay Bhatia
*Assistant Examiner* — Miranda Huang
(74) *Attorney, Agent, or Firm* — DeLizio Gilliam, PLLC (57) ABSTRACT

A system for integrating databases comprises a first virtual table, a second virtual table, a common table, a list, a generating section, and a selecting section. The first virtual table corresponds to a first data. The second virtual table corresponds to a second data. The common table is associated with the first and second virtual tables. The list indicates information about associations between the first and second virtual tables and the common table. The generating section generates two or more access plans from a database query on the common table. The two or more access plans involve at least one of the first and second virtual tables in accordance with the list. The selecting section selects one of the two or more access plans generated by the generating section to be used to execute the database query.

12 Claims, 7 Drawing Sheets

(56) References Cited

U.S. PATENT DOCUMENTS

| | | | |
|---|---|---|---|
| 6,560,593 B1* | 5/2003 | Kosciuszko et al. | 707/2 |
| 6,567,802 B1 | 5/2003 | Popa et al. | |
| 6,581,055 B1* | 6/2003 | Ziauddin et al. | 707/4 |
| 6,618,719 B1* | 9/2003 | Andrei | 707/2 |
| 6,629,094 B1* | 9/2003 | Colby et al. | 707/713 |
| 6,694,306 B1* | 2/2004 | Nishizawa et al. | 707/3 |
| 6,708,179 B1 | 3/2004 | Arora | |
| 7,089,225 B2 | 8/2006 | Li et al. | |
| 7,133,876 B2 | 11/2006 | Roussopoulos et al. | |
| 7,165,072 B2 | 1/2007 | Feng et al. | |
| 7,440,963 B1 | 10/2008 | Bello et al. | |
| 2003/0088558 A1 | 5/2003 | Zaharioudakis et al. | |
| 2004/0122828 A1 | 6/2004 | Sidle et al. | |
| 2004/0122844 A1 | 6/2004 | Malloy et al. | |
| 2004/0122868 A1 | 6/2004 | Chan et al. | |
| 2004/0205062 A1* | 10/2004 | Brown et al. | 707/3 |
| 2004/0260685 A1* | 12/2004 | Pfleiger et al. | 707/3 |
| 2005/0097078 A1 | 5/2005 | Lohman et al. | |
| 2005/0114307 A1* | 5/2005 | Li et al. | 707/3 |
| 2005/0114311 A1 | 5/2005 | Cheng | |
| 2005/0125325 A1 | 6/2005 | Chai et al. | |
| 2005/0149584 A1 | 7/2005 | Bourbonnais et al. | |
| 2005/0165741 A1 | 7/2005 | Gordon | |
| 2005/0210010 A1* | 9/2005 | Larson et al. | 707/3 |
| 2005/0235003 A1* | 10/2005 | Folkert et al. | 707/201 |
| 2006/0212436 A1 | 9/2006 | Gupta et al. | |
| 2006/0230017 A1* | 10/2006 | Larson et al. | 707/2 |
| 2006/0253483 A1 | 11/2006 | Yu | |
| 2007/0043749 A1 | 2/2007 | Gerber et al. | |
| 2007/0073759 A1* | 3/2007 | El-Sabbagh | 707/102 |
| 2007/0094237 A1* | 4/2007 | Mitchell et al. | 707/2 |
| 2007/0214107 A1* | 9/2007 | Bello et al. | 707/2 |

FOREIGN PATENT DOCUMENTS

| | | |
|---|---|---|
| JP | 2001084257 | 3/2001 |
| JP | 2001109758 | 4/2001 |
| WO | WO01/06417 A1 | 1/2001 |

OTHER PUBLICATIONS

G. J. L. Kemp, P. M. D. Gray, and A. R. Sjostedt, L. Kerschberg and M. Kafatos, "Rewrite rules for quantified subqueries in a federated database", Proc. 13th Int. Conf. Sci. Statist. Database Management, pp. 134-143, 2001. :IEEE Comput. Soc. Press.*

IBM DB2 Information Integrator, Federated Systems Guide, Version 8.2, [online], Dec. 16, 2004, International Business Machines Corporation, <ftp://ftp.software.ibm.com/ps/products/db2/info/vr82/pdf/en_US/iiyfpe81.pdf>.

"U.S. Appl. No. 11/848,164 Office Action", Aug. 26, 2009 , 22 pages.

Hanov, Steve et al., "Refactoring My SQL to Support Materialized Views", *University of Waterloo* Waterloo, Ontario www.cs.uwaterloo.ca/~hsmit/reports/cs746_report.pdf , 1-11.

Ren, Dongmei et al., "A Predicate-based Incremental Refresh Method for a Data Warehouse", *IACC 258C*, USA 2006.

Yeung, Gary , "Multi-Agent Framework for Immediate Incremental View in Data Wherehousing", *Simon Frasier University* pp. 1-58, British Columbia Sep. 2001 , 1-58.

* cited by examiner

INTEGRATING DATABASES

CROSS-REFERENCE TO RELATED APPLICATIONS

This application claims, under 35 U.S.C. §119, the benefit of priority of Japanese Patent Application No. 2006-294295 filed on Oct. 30, 2006, and entitled "SYSTEM, METHOD, AND PROGRAM PRODUCT FOR INTEGRATING DATABASES" hereby incorporated by reference herein.

TECHNICAL FIELD

Embodiments of the invention(s) relate to database technology, more specifically, to a system, a method, and a program product for integrating multiple databases.

BACKGROUND

Large-scale database systems using a computer have been constructed in a wide range of fields in recent years. In large-scale database systems, there may occur a need to integrate data scattered over a number of distributed databases.

For example, in a research institute's information system including multiple types of databases for managing various research data acquired by various researchers, there may be a need to integrate scattered pieces of data in order to find out information or knowledge contained in such scattered pieces of data. As another example, there may be a need to integrate different databases that have previously been run by different companies, due to a merger between companies.

In order to integrate such various types of databases distributed on a network, a mechanism for federating databases has been used. This mechanism is a technology that accesses a group of databases existing in a distributed manner rather than a combined database to provide a grouping of database images. This mechanism is one in which individual databases are directly accessed, so it can readily support addition of a new data item. Therefore, the time and/or cost for re-designing or re-constructing the database system can be reduced.

SUMMARY

A system for integrating databases comprises a first virtual table, a second virtual table, a common table, a list, a generating section, and a selecting section. The first virtual table corresponds to a first data. The second virtual table corresponds to a second data. The common table is associated with the first and second virtual tables. The list indicates information about associations between the first and second virtual tables and the common table. The generating section generates two or more access plans from a database query on the common table. The two or more access plans involve at least one of the first and second virtual tables in accordance with the list. The selecting section selects one of the two or more access plans generated by the generating section to be used to execute the database query

DETAILED DESCRIPTION

The description that follows includes exemplary systems, methods, techniques, instruction sequences and computer program products that embody techniques of the present invention. However, it is understood that the described invention may be practiced without these specific details. For instance, although examples refer to SQL, other techniques for accessing a database can be used. In other instances, well-known instruction instances, protocols, structures and techniques have not been shown in detail in order not to obfuscate the description.

Figure 1:
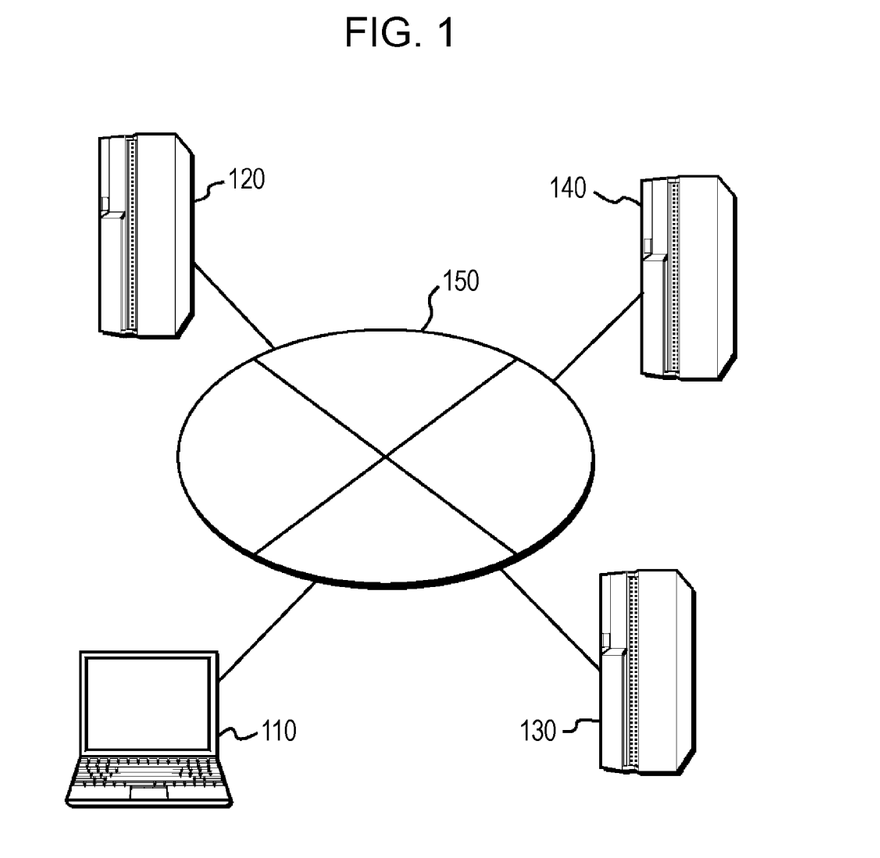
FIG. 1 is a high level overall schematic view showing a system according to an embodiment of this invention.

FIG. 1 is a high level overall schematic view showing a system 100 according to this embodiment. The system 100 according to this embodiment includes a client 110, a federated database server 120, and distributed database servers 130 and 140, all of which are coupled to one another via a network 150.

The client 110 according to this embodiment creates a database query in SQL format to query a database in accordance with an operation performed by a user and sends the query to the federated database server 120. SQL is a well-known database technology, so it will not be described in detail herein.

The federated database server 120 integrates database systems included in the distributed database servers 130 and 140 to process a database query from the client 110. The distributed database servers 130 and 140 are servers in which a database system is constructed in a storage device, such as a magnetic disk.

The network 150 is a communication route for coupling the client 110, federated database server 120, and distributed database servers 130 and 140. For example, it is realized by the Internet. If the network 110 is the Internet, the systems are connected using a well-known communication protocol, TCP/IP.

Figure 2:
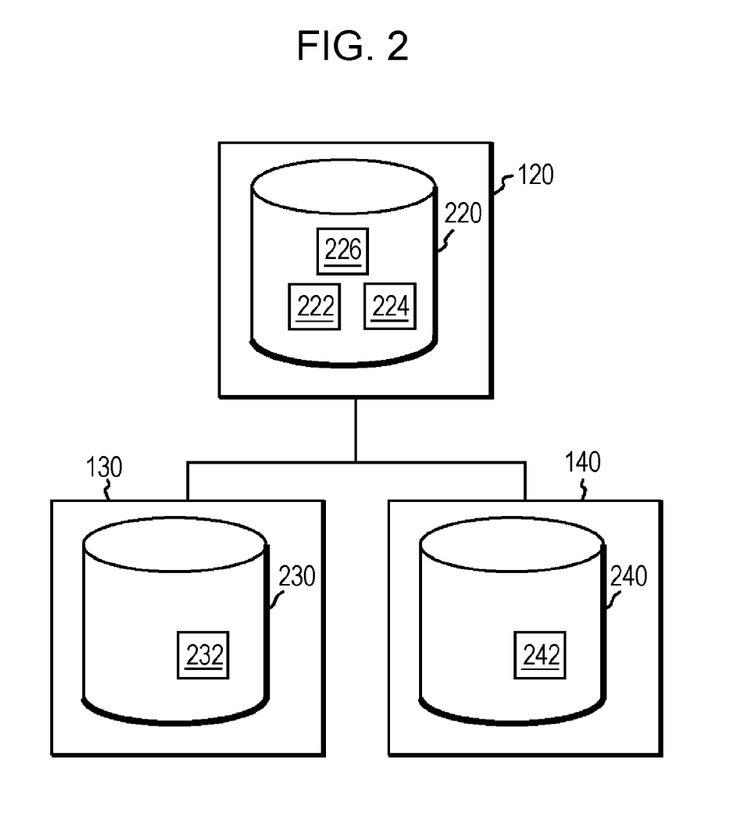
FIG. 2 is a schematic diagram showing a logical configuration of the system according to this embodiment.

FIG. 2 is a schematic diagram showing a logical configuration of a part of the system according to this embodiment. FIG. 2 shows the federated database server 120, and distributed database servers 130 and 140 among the elements of this embodiment shown in FIG. 1.

The distributed database servers 130 and 140 according to this embodiment include distributed database systems 230 and 240, respectively. In this embodiment, it is assumed that databases included in the distributed database systems 230 and 240 have different structures. Further, the distributed database systems 230 and 240 may be constructed using database management system (DBMS) software provided by different database vendors. For example, those skilled in the art can construct the distributed database system 230 using the DB2®, which is a DBMS software provided by the International Business Machines Corporation, and the distributed database system 240 using the Oracle Database 10g, which is a DBMS software provided by the Oracle Corporation.

In this embodiment, it is assumed that the distributed database system 230 includes some data (referred to as "first data") and a database table corresponding to the first data (referred to as "database table 232"). It is also assumed that the distributed database system 240 includes data (second data), which is a replica of the first data, and a database table corresponding to the second data (referred to as a "database table 242"). Note that those skilled in the art can create such a replica as appropriate by referring to a well-known database replication technology, so creation of such a replica will not be described in detail.

The federated database server 120 according to this embodiment includes a federated database system 220. The federated database system 220 includes database tables 222 and 224 (referred to as a "first virtual table 222" and a "second virtual table 224," respectively) associated with the above-described database tables 232 and 242, respectively. Providing such virtual tables allows the federated database system 220 to handle the distributed database systems 230 and 240 as if the federated database system 220 managed the distributed database systems 230 and 240.

It is to be noted that the federated database system 220 according to this embodiment includes a virtual database table (referred to as a "common table 226") provided so as to be common to the first and second virtual tables 222 and 224. In this embodiment, a database query on the common table sent to the federated database server 120 by the client 110 can be processed integrally using an appropriate virtual table. Processing of a database query in the federated database system 220 will be described later in detail in FIG. 6 and so forth.

Figure 3:
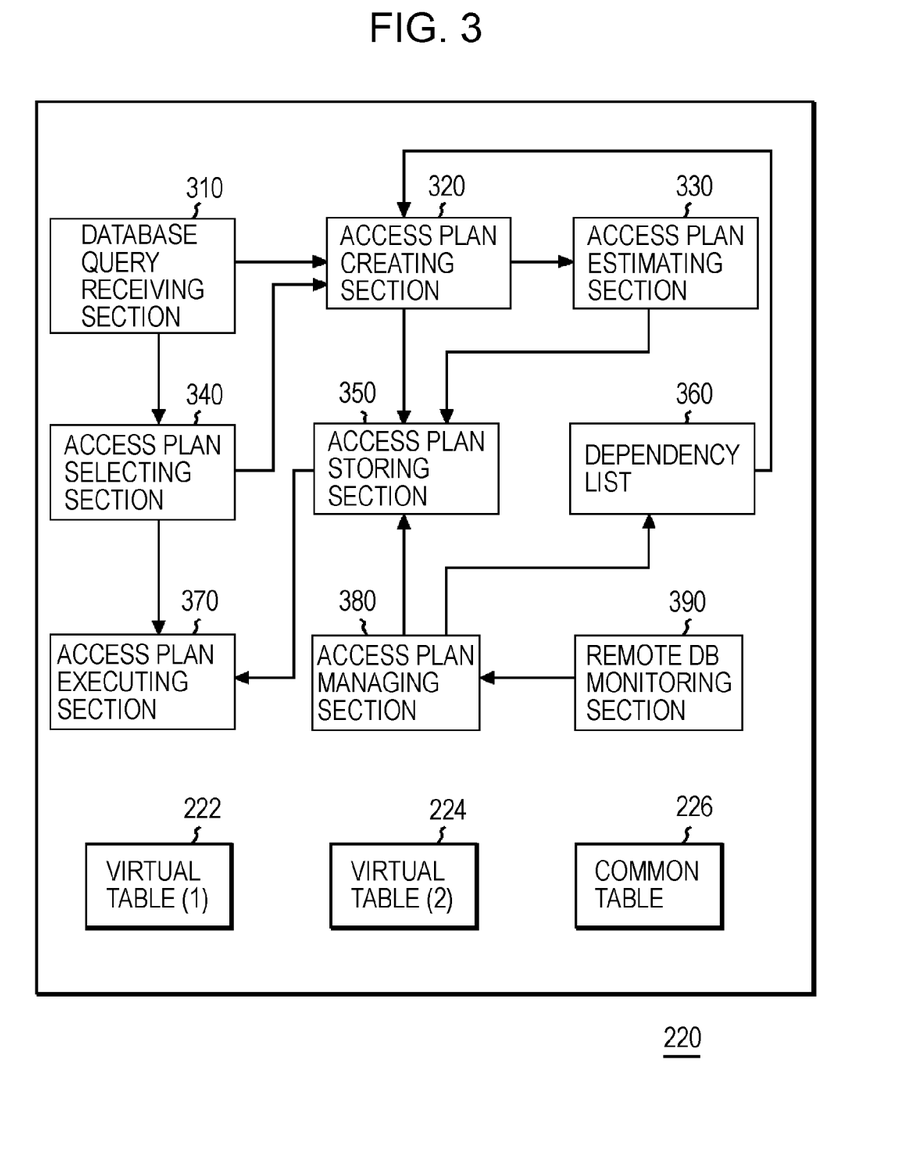
FIG. 3 is a functional block diagram of a federated database system according to this embodiment.

FIG. 3 is a functional block diagram of the federated database system 220. The functions of elements shown in FIG. 3 can be realized by causing hardware resources and software to collaborate with one another in an information processing device having a hardware configuration to be discussed later referring to FIG. 8. Specifically, these functions can be realized by loading an operating system or a computer program stored in a hard disk device 13 or the like to a main memory 4 and then causing a CPU 1 to read the operating system or computer program.

In this embodiment, the federated database server 120 includes a database query receiving section 310, an access plan generating section 320, an access plan estimating section 330, an access plan selecting section 340, an access plan storing section 350, a dependency list 360, an access plan executing section 370, an access plan managing section 380, and a remote database monitoring section 390. The federated database server 120 also includes the first and second virtual tables 222 and 224, and the common table 226.

The database query receiving section 310 according to this embodiment serves to receive a database query sent via the network 150 by the client 110. Note that a database query according to this embodiment is a database query on the common table 226 (specifically, a database query whose SQL statement includes the designation of the name of the common table 226).

The access plan generating section 320 according to this embodiment generates one or more access plans (concrete procedures on how to access the distributed databases) in which the first virtual table 222 or second virtual table 224 is used, from the database query received by the database query receiving section 310, based on the content of the dependency list 360 to be discussed later.

Specifically, the access plan generating section 320 according to this embodiment acquires the name of the common table 226 from the database query received by the database query receiving section 310 and then acquires the name of the first virtual table 222 from the acquired table name using the dependency list 360.

Then the access plan generating section 320 rewrites the database query so that the name of the common table 226 in the database query is replaced with the name of the first virtual table 222 and compiles the rewritten database query in order to generate an access plan in which the first virtual table 222 is used.

In this embodiment, it is assumed that the access plan generating section 320 performs a similar process to what is described above with respect to the second virtual table 224 in order to generate an access plan in which the second virtual table is used. At least a part of the generated access plan is cached in the access plan storing section 350 to be discussed later.

In this embodiment, it is assumed that in order to effectively reuse the access plans cached in the access plan storing section 350 to be discussed later, the access plan generating section 320 performs the above-described access plan generating process only when no access plans are cached in the access plan storing section 350.

The access plan estimating section 330 according to this embodiment serves to estimate the cost of each of multiple access plans generated by the access plan generating section 320. Specifically, the access plan estimating section 330 calculates the response time and the estimated computer resource amount to be used for each access plan. Calculation of such response time and estimated computer resource amount to be used can be performed as appropriate by those skilled in the art, so it will not be described in detail herein. At least a part of information on the costs of the generated access plans is cached in the access plan storing section 350.

The access plan selecting section 340 according to this embodiment serves to select one access plan from the access plans generated by the access plan generating section 320, based on the costs estimated by the access plan estimating section 330.

The access plan storing section 350 according to this embodiment caches one or more access plans generated by the access plan generating section 320 and the costs estimated by the access plan estimating section 330.

The dependency list 360 according to this embodiment is a list in which information on the names of the virtual tables and common table used in the federated database system 220, such as the virtual tables 222 and 224 and common table 226, as well as information on dependencies and associations between the common table and virtual tables is stored.

The access plan executing section 370 according to this embodiment acquires the access plan selected by the access plan selecting section 340 from the access plan storing section 350 and uses the acquired access plan to execute the above-mentioned database query.

Once the first or second data has become unavailable, the access plan managing section 380 according to this embodiment serves to disable the cached access plan in which the virtual table corresponding to the unavailable data is used. Once the unavailable first or second access plan has become available again, the access plan managing section 380 also serves to change the disabled access plan to an enabled one.

Further, if additional data that is a replica of the first data is newly created in another database system (not shown), the access plan managing section 380 adds information indicating that the new replica has been created, to access plans in which the common table 226 is used. If such information exists, the access plan generating section 320 generates an additional access plan regarding the new replica even though access plans are stored in the access plan storing section 350.

In this embodiment, when the access plan selecting section 340 selects an access plan, it detects whether or not such information is added to the access plan. Once the access plan selecting section 340 has detected addition of such information, the access plan generating section 320 generates an additional access plan. The generated additional access plan is stored in the access plan storing section 350.

The remote database monitoring section 390 according to this embodiment serves to monitor whether or not the first and second databases 230 and 240 placed remotely from the federated database system 220 are available. Once any database being monitored by the remote database monitoring section 390 has become unavailable, the remote database monitoring section 390 also serves to notify the access plan managing section 380 of the fact. On the other hand, once any temporarily unavailable database being monitored by the remote database monitoring section 390 has been recovered into an available one, the remote database monitoring section 390 also serves to notify the access plan managing section 380 of the fact.

When notified that a database has become unavailable, by the remote database monitoring section 390, the access plan managing section 380 according to this embodiment changes the status of an access plan in which the unavailable database is used, to disabled. On the other hand, when notified that a database has become available, by the remote database monitoring section 390, the access plan managing section 380 changes the status of an access plan in which the available database is used, to enabled. The access plan selecting section 340 determines go/no-go of use of each access plan on the basis of such statuses to select an access plan to be executed.

Figure 4:
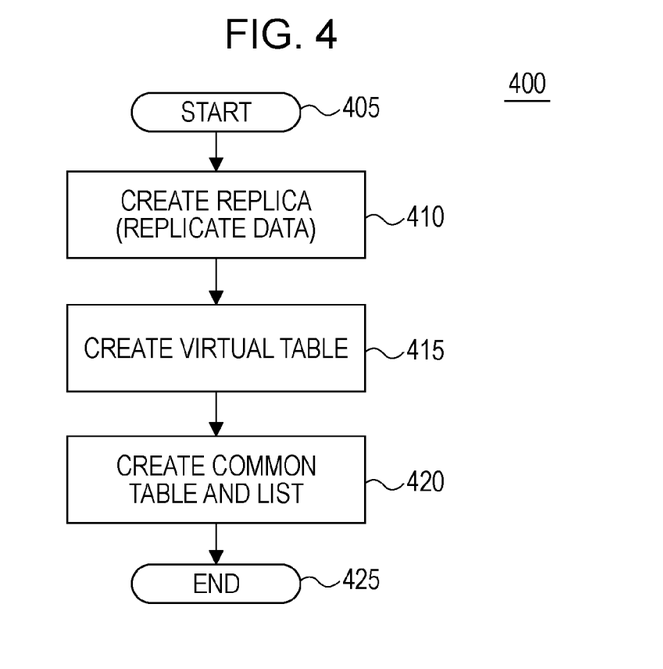
FIG. 4 is a flowchart showing an initialization operation of the system according to this embodiment.

FIG. 4 is a flowchart 400 representing the initialization operation of the system 100 according to this embodiment. Assume that when the initialization operation is started, the system 100 includes the first and second database systems 230 and 240, the first database system 230 includes the first data and the first database table 232 corresponding to the first data, and the remote database monitoring section 390 has already started a remote database monitoring process. Operations in such a monitoring process will be described in detail later referring to FIG. 5 and the like.

The process starts with step 405. Then in step 410, the second data, which is a replica of the first data, is created in the second database system 240. Also in step 410, the second database table 242 corresponding to the second data is created in the second database system 240.

The process proceeds to the step 415. The virtual tables 222 and 224 corresponding to the first and second database tables 232 and 242 are created in the federated database system 220. Note that creation of these virtual tables can be carried out as appropriate by those skilled in the art, so it will not be described in detail herein.

The process proceeds to step 420. The common table 226 common to the virtual tables 222 and 224 created in step 415 is formed in the federated database system 220. In step 420, the virtual tables 222 and 224 are each associated with the common table 226 and the dependency list 350 for storing information on such associations is created in the federated database system 220. Then the process proceeds to step 425 and ends.

As a matter of course, the creation of the virtual tables and common table, associations between these tables, and the creation of dependency list 360 described above may be carried out according to an explicit input by the administrator of the federated database system 220. Alternatively, after the federated database system 220 is set up such that it can detect that the second data has been created as a replica of the first data, it may automatically carry out a part or all of the above-mentioned operations upon such detection.

Figure 5:
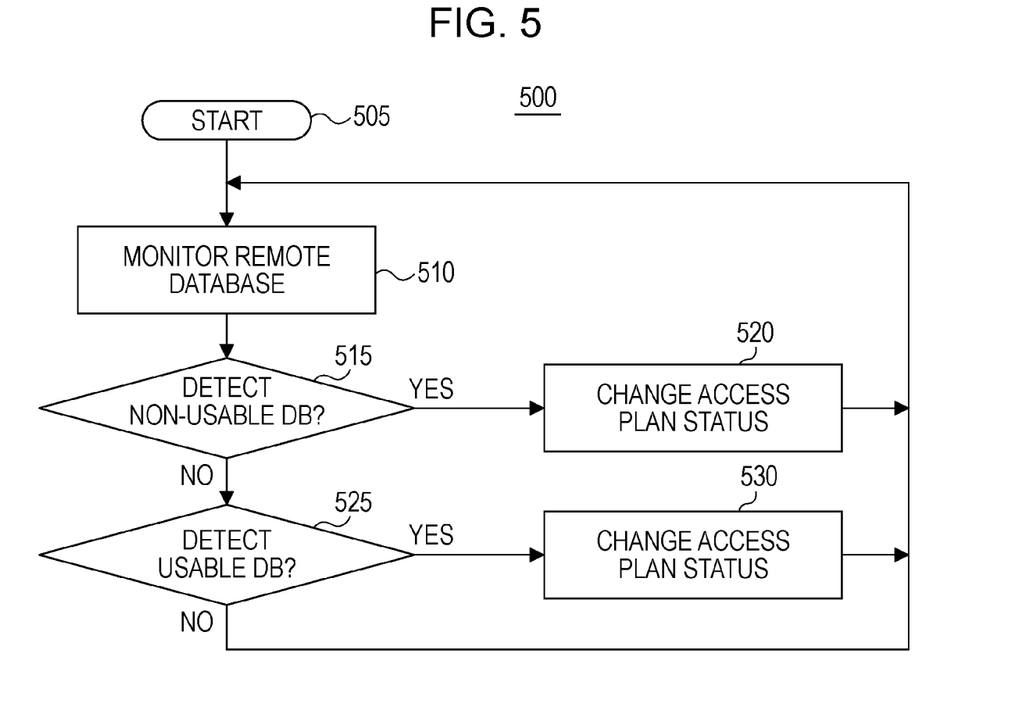
FIG. 5 is a flowchart representing distributed database system monitoring operations according to this embodiment.

FIG. 5 is a flowchart 500 representing remote database monitoring process operations carried out by the remote database monitoring section 390 resident in the federated database system 220 according to this embodiment. The process starts with step 505. In step 510, the remote database monitoring section 390 monitors whether or not each of remotely distributed database systems (distributed database systems 230 and 240 in this embodiment) integrated by the federated database system 220 is available. Specifically, such monitoring is realized by sending a confirmation request to each of target database systems for monitoring periodically by the remote database monitoring section 390.

Next in step 515, it is determined whether or not a remotely distributed database system that was previously available but is now unavailable has been detected. In step 515, if it is determined that such a remote database system has been detected, the process proceeds to step 520 via the arrow of YES.

Once the distributed database system that was previously available is now unavailable has been detected in step 515, the remote database monitoring section 390 notifies the access plan managing section 380 in step 520 of the fact. Then the access plan managing system 380 changes the status of an access plan in which access to the unavailable remotely distributed database system is required, to disabled. Thereafter, the process returns to step 510 and the monitoring continues.

If no unavailable remote database is detected in step 515, the process proceeds to step 525 via the arrow of NO. In step 525, it is determined whether or not a distributed database system that was previously unavailable but is now available has been detected. If it is determined in step 525 that such a remote database has been detected, the process proceeds to step 530 via the arrow of YES.

Once the distributed database system that was previously unavailable is now available has been detected in step 525, the remote database monitoring section 390 notifies the access plan managing section 380 in step 530 of the fact. Then the access plan managing system 380 changes the status of an access plan in which access to the available remotely distributed database system is required, into enabled. Thereafter, the process returns to step 510 and the monitoring continues.

If no remote database that has become available is detected in step 525, the process returns to step 510 via the arrow of NO and the monitoring continues.

Figure 6:
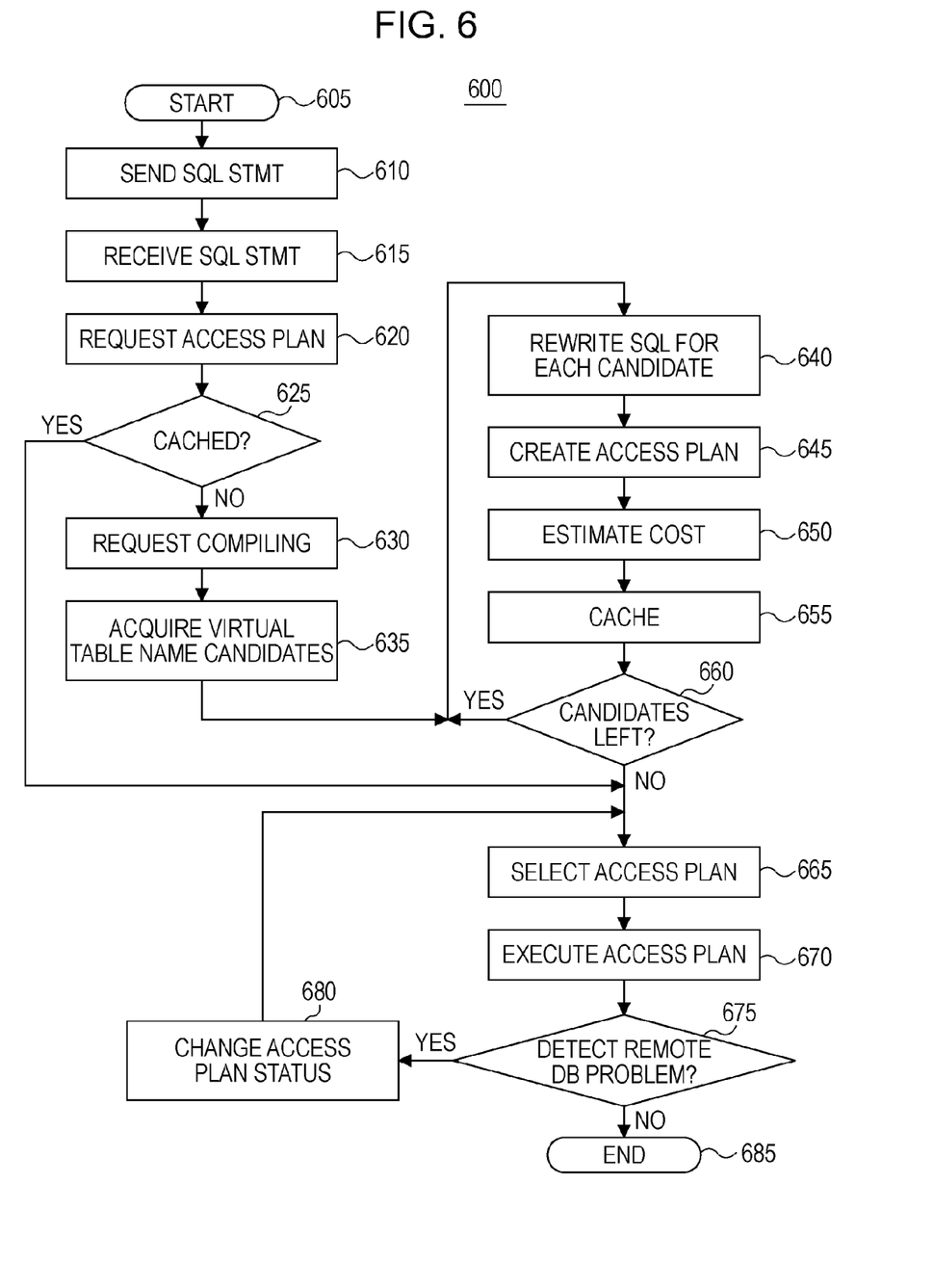
FIG. 6 is a flowchart representing operations of the system to a database query according to this embodiment.

FIG. 6 is a flowchart 600 representing operations of the system to a database query according to this embodiment. The process starts with step 605. In step 610, the client 110 sends a database query (specifically, SQL statement) for the common table 226, which is created in the initialization operations, to the federated database server 120.

The process proceeds to step 615. The database query receiving section 310 of the federated database server 120 receives the database query sent by the client 110 in step 610. The process proceeds to step 620. The federated database server 120 requests the access plan executing section 340 to generate an access plan in order to process the received query.

Next in step 625, the access plan selecting section 340 determines whether or not an access plan is already cached in the access plan storing section 350 and whether or not a cached access plan includes information indicating that data, which is a new replica, has been created. If it is determined that no access plan is cached or a cached access plan includes information indicating that data, which is a new replica, has been created, the process proceeds to step 630 via the arrow of NO. If it is determined that an access plan is cached and the cached access plan includes no information indicating that data, which is a new replica, has been created, the process proceeds to step 665 via the arrow of YES.

In step 630, the access plan selecting section 340 requests the access plan generating section 320 to compile the query to generate an access plan. Next, in step 635, the name of a virtual table corresponding to the common table described in the database query received in step 615 using the dependency list 360 is acquired. In this embodiment, the common table 226 is described in a database query, and the first and second virtual tables 222 and 224 are each associated with the common table 226 in the dependency list 360. Therefore, the names of the first and second virtual tables 222 and 224 are acquired in step 635.

If the content of an SQL statement requires not just referring to data but carrying out an actual data change as INSERT (insertion of data)/UPDATE (update of data)/DELETE (deletion of data) does, the query must be carried out with respect to a particular virtual table. For example, there is a case in which not the second data, which is replicated data, but the first data, which is the original data, must be changed depending on a setting of a replica of the first data according to this embodiment. In such a case, it is preferable to store information indicating that only a particular virtual table (first virtual table) can be changed, in the common table 226, so that only the name of the first virtual table can be acquired in step 630.

Also in step 635, if the access plan selecting section 340 determines that a cached access plan includes information indicating that data, which is a new replica, has been created, it is good enough to create an additional access plan only with respect to the new replicated data. This allows acquisition of the name of a virtual table to be finished only with acquisition of the name of a virtual table with respect to the new replicated data.

Next, in a loop from step 640 to step 660, access plan generation, cost estimation, and the like is carried out for each of the virtual tables (first and second virtual tables in this embodiment) acquired in step 635.

Specifically, in step 640, the access plan generating section 320 rewrites the name of the common table in the database query (SQL statement) to the name of an acquired virtual table. Next, in step 645, the access plan generating section 320 generates an access plan based on the rewritten SQL statement. In step 650, the access plan estimating section 330 estimates the cost (estimation of response time, computer resource amount to be used, or the like) of the generated access plan. In step 655, the access plan and its cost generated in steps 645 and 650, respectively, are cached in the access plan storing section 350. This series of processes are carried out for each of the virtual table names acquired in step 635.

Upon completion of access plan generation (step 645), cost estimation (step 650), and their caching (step 655) for each of the virtual tables names acquired in step 635, the process proceeds from step 660 to step 665 via the arrow of NO.

In step 665, the access plan selecting section 340 selects what is determined to be an optimal one, from access plans whose status is enabled among one or more access plans cached in the access plan storing section 350 based on the costs cached in the access plan storing section 350 in accordance with a predetermined policy (for example, an access plan that is shortest in response time).

If the statues of the cached access plans are all disabled, an error message to that effect is sent back to the client that has made the database query, and then the process ends.

The process proceeds to step 670. The access plan executing section 370 executes an access plan selected in step 665. Note that if the access plan is successfully executed in step 670, the result is sent back to the client that has made the database query, which is a SQL statement. Next, the process proceeds to step 675. In step 675, from a result of execution of the access plan in step 670, it is determined whether the remote database has been detected to be unavailable due to a problem or the like.

If it is determined in step 675 that the remote database has been detected to be unavailable, the process proceeds to step 680 via the arrow of YES. In step 680, the access plan managing section 380 is notified that it is determined in step 675 that the remote database has been detected to be unavailable. The access plan managing section 380 changes the status of an access plan (is not limited to the access plan selected in step 665) that requires access to the remote distributed database system that has been determined to be unavailable in step 675, to disabled.

The process returns from step 680 to step 665. In step 665, an optimal access plan is selected from the remaining access plans except for an access plan whose status is disabled. This loop is repeated until an optimal, enabled access plan is found. If such an access plan is found, the process proceeds from step 675 to step 685 via the arrow of NO.

Figure 7:
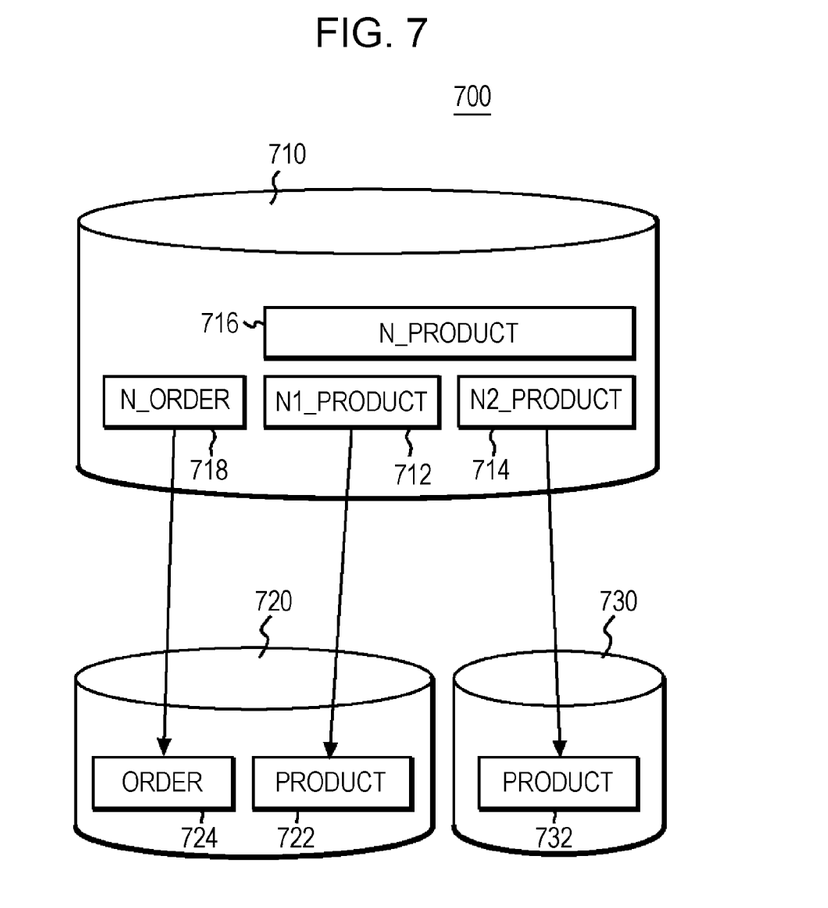
FIG. 7 is a drawing showing a specific example in which processing of joining database tables is performed in the federated database system according to this embodiment.

FIG. 7 is a drawing 700 showing a specific example in which a process of joining database tables is performed in the federated database system according to this embodiment. The specific example in FIG. 7 includes a federated database system 710 and distributed database systems 720 and 730. The distributed database system 730 includes a product table 732 (table name: "PRODUCT") in which a product name (PRODUCTNAME) and a price (PRICE) are presented for each product key (PRODUCTKEY). A specific example of the product table 732 is shown in Table 1.

TABLE 1

| PRODUCTKEY | PRODUCTNAME | PRICE |
|---|---|---|
| 10 | Product-A | 1000.00 |
| 20 | Product-B | 1500.00 |

The distributed database system 720 includes a product table 722 that is a replica of the product table 732. The distributed database system 720 further includes an order table 724 (table name: "ORDER") in which a product key (PRODUCTKEY), a customer key (CUSTOMERKEY), and an order amount (AMOUNT) are presented for each order key (ORDERKEY). A specific example of an order table 724 is shown in Table 2.

TABLE 2

| ORDERKEY | PRODUCTKEY | CUSTOMERKEY | AMOUNT |
|---|---|---|---|
| 1 | 10 | 100 | 4 |
| 2 | 20 | 100 | 2 |
| 3 | 10 | 110 | 1 |
| 4 | 10 | 110 | 3 |

The federated database system 710 includes virtual tables 714, 712, and 718 corresponding to the product tables 732 and 722 and the order table 724, respectively. The names of the virtual tables 714, 712, and 718 are defined as "N2_PRODUCT", "N1_PRODUCT", and "N_ORDER," respectively. The federated database system 710 further includes a common table 716 provided so as to be common to the virtual tables 714 and 712. The name of the common table 716 is defined as "N_PRODUCT."

Assume that in the above-described system, the federated database system 710 receives a database query that is made up of an SQL statement shown in Table 3 including the designation of the common table 716. The SQL statement shown in Table 3 requests determining total prices by multiplying order amounts (AMOUNT) obtained from the table "N_ORDER" by prices (PRICE) obtained from the table "N_PRODUCT," and creating a table in which a total price is presented for each customer key. The SQL statement shown in Table 3 also requests presenting customer keys in ascending order in a table to be created.

TABLE 3

| select customerkey, sum (amount * price) as total_price from n_order, n_product where n_order productkey = n_productkey group by customerkey order by customerkey |
| --- |

In this embodiment, "N_PRODUCT" in the SQL statement shown in Table 3, which is the name of the common table 716, is replaced with "N1_PRODUCT" and "N2_PRODUCT," both of which are associated with "N_PRODUCT." As a result, SQL statements shown in Tables 4 and 5 are created. Then access plan generation and cost estimation is performed with respect to the created SQL statements.

Here, an access plan generated by compiling the SQL statement including the designation of "N1_PRODUCT" shown in Table 4 is to perform a table join between the tables 722 and 724 in the distributed database system 720 and then to send back only the joined table to the federated database system 710. Therefore, data traffic between the federated database system and distributed database system includes data on the joined table whose size is relatively small.

TABLE 4

| select customerkey, sum (amount * price) as total_price from n_order, n1_product where n_order productkey = n1_product productkey group by customerkey order by customerkey |
| --- |

On the other hand, according to an access plan generated by compiling the SQL statement shown in Table 5 including the designation of "N2_PRODUCT", it is necessary to receive all data on "ORDER" and all data on "PRODUCT" required to perform a table join from the distributed database system 720 and 730, respectively, and then to perform the table join in the federated database system 710. Therefore, data traffic between the federated database system and distributed database systems includes yet-to-be joined data whose size is relatively large.

TABLE 5

| select customerkey, sum (amount * price) as total_price from n_order, n2_product where n_order productkey = n2_product productkey group by customerkey order by customerkey |
| --- |

Therefore, the estimate of the response time that is a cost of this access plan is larger than that of the access plan generated by compiling the SQL statement including the designation of "N1_PRODUCT" shown in TABLE 4. As a result, the federated database system 710 that has received the database query shown in TABLE 3 selects and uses the access plan generated by compiling the SQL statement shown in TABLE 4 including the designation of "N1_PRODUCT" in order to execute the query. As a result of that execution, a table shown in TABLE 6 is obtained.

TABLE 6

| CUSTOMERKEY | TOTAL_PRICE |
| --- | --- |
| 100 | 7000 |
| 110 | 4000 |

It will be understood from the above description that according to this embodiment, the optimal access plan is used to execute the database query.

Figure 8:
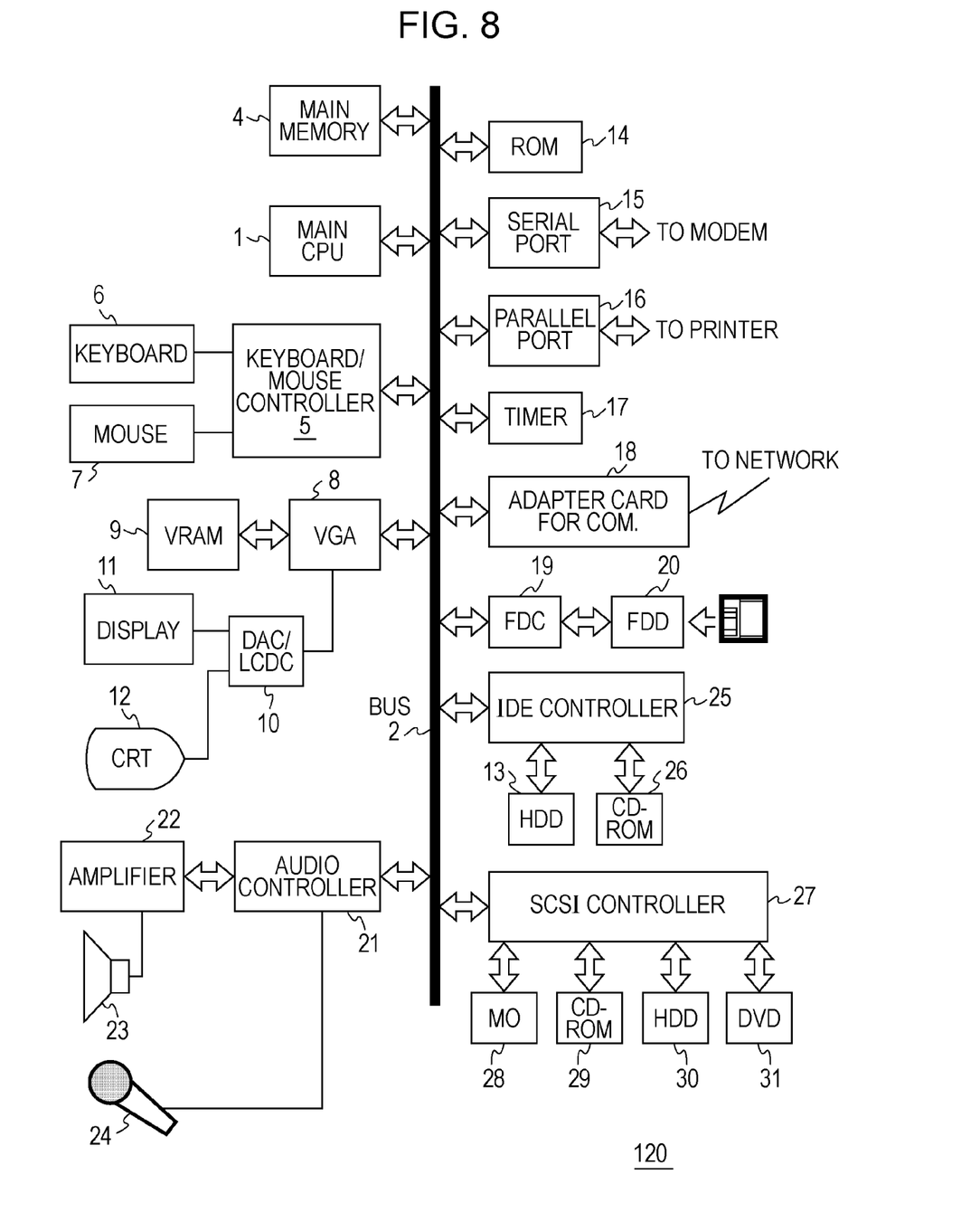
FIG. 8 is a schematic diagram showing an example of the hardware configuration of a preferred computer device to realize the federated database system according to this embodiment.

FIG. 8 is a diagram showing an example of the hardware configuration of a preferred information processing device to realize the system according to this embodiment. The information processing device 120 includes a central processing unit (CPU) 1 and a maim memory 4, both of which are coupled to a bus 2. Removable storages (external storage systems that can replace a recording medium), such as hard disk devices 13 and 30, CD-ROM devices 26 and 29, flexible disc device 20, an MO device 28, a DVD device 31, are coupled to the bus 2 via a floppy disc controller 19, an IDE controller 25, an SCSI controller 27, and so forth. The information processing device 120 also includes a serial port 15, parallel port 16, and timer 17, which are all coupled with the bus 2.

Recording media, such as a flexible disc, an MO, a CD-ROM, and a DVD-ROM, are inserted into the removable storages. These recording media, hard disk devices 13 and 30, or a ROM 14 can record the code of an computer program for carry out this invention by giving an instruction to the CPU, or the like in collaboration with an operating system. Loading the computer program to the main memory 4 causes the computer program to be executed. The computer program can also be compressed, or divided into a number of parts so as to be recorded to multiple media.

The information processing device 120 receives inputs from input devices, such as a keyboard 6 and a mouse 7, via a keyboard/mouse controller 5. The information processing device 120 is coupled to a display 11 for presenting visual data to a user, via a DAC/LCDC 10. The information processing device 120 is also depicted as having a CRT 12 coupled with the DAC/LCDC 10. The DAC/LCDC 10 is coupled with a VGA 8, which is coupled to the bus 2. The VGA 8 is also depicted as coupled with VRAM 9. The information processing device 120 also provides output via a speaker 23. The speaker 23 is coupled with an amplifier 22. The amplifier 22 is coupled with an audio controller 21, which is coupled with the bus 2. The audio controller 21 is also depicted as being coupled with a microphone 24 for receiving audio input.

The information processing device 120 can be connected to a network via a network adapter 18 (Ethernet® card or token ring card) or the like to communicate with other computers or the like. The information processing device 120 also can be coupled to a printer (not shown) via a parallel port, or a modem (not shown) via a serial port.

It will easily be understood from the above description that the preferred information processing device to realize the system according to this embodiment is realized by a typical information processing device, such as a personal computer, a workstation, or a mainframe, or a combination thereof. However, these elements are illustrative and all the elements are not essential elements of this invention.

As a matter of course, various modifications such as realizing the hardware elements of the information processing device used in this embodiment by combining multiple machines and then allocating the functions of these elements to those machines can easily be presumed by those skilled in the art. As a matter of course, those modifications are concepts included in the technical idea of this invention.

The system according to this embodiment can adopt operating systems supporting graphical user interface (GUI) multi-window environments, such as the Windows® operating systems provided by the Microsoft Corporation, the MacOS® provided by the Apple Computer Incorporated, and UNIX (R)-based systems including the X Window System (for example, AIX® provided by the International Business Machines Corporation).

It can be understood from the above description that the system used in this embodiment is not limited to a particular operating system environment. In other words, any operating system can be adopted if it can demonstrate resource managing functions that allow application software or the like to use resources of a data processing system. Such resource managing functions include the hardware resource managing function, file handling function, simultaneous peripheral operation online (SPOOL) function, job managing function, memory protection function, and virtual memory managing function. These functions are well known by those skilled in the art, so they will not be described in detail herein.

Further, this invention can be realized as hardware, software, or a combination of both. A typical one of examples in which this invention is realized by a combination of hardware and software is to realize this invention in a data processing system including a predetermined program. In this case, loading the predetermined program to the data processing system and executing the program causes the program to control the data processing system so that the processing according to this invention is executed. This program includes a group of instructions that can be represented by an arbitrary language, code, or notation. Such instructions allow the system to perform a particular function immediately, or (1) after the instructions are converted into another language, code, or notation, (2) after a replica of the instructions is made in another medium, or after both (1) and (2) are done.

As a matter of course, not only such a program but also a medium recording the program fall within the scope of the invention. The program for performing the functions of the invention can be stored in an arbitrary computer-readable recording medium, such as a flexible disc, an MO, a CD-ROM, a DVD, a hard disk device, a ROM, an MRAM, or a RAM. In order to store such a program to a recording medium, the program can be downloaded from another data processing system connected via a communications network or replicated from another recording medium. Further, such a program can be compressed or divided into several parts so as to be stored in a single or multiple recording media. It is to be noted that a program product for carrying out this invention, as a matter of course, can be provided in various forms.

It can be understood from the above description that according to this embodiment, a federated database system that can process a database query at a lower cost and with efficiency can be constructed.

It will be apparent for those skilled in the art that various modifications or improvements can be made to the embodiment described above. For example, as described above, the federated database system 220, and distributed database systems 230 and 240 according to this embodiment are realized by multiple pieces of hardware (server machines). However, this invention is not limited to any particular hardware configuration. Specifically, the federated database system 220, and distributed database systems 230 and 240 may operate in an identical piece of hardware (computer device) or in different pieces of hardware. It is to be noted that such a modification or improvement also falls within the technical scope of this invention as a matter of course.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A system comprising:
   one or more machine readable media encoded with,
      a first virtual table corresponding to a first data;
      a second virtual table corresponding to a second data;
      a common table that is associated with the first and second virtual tables;
      a list with information about associations between the first and second virtual tables and the common table;
   a generating section that,
      accesses the list to determine the common table is associated with the first virtual table and the second virtual table,
      rewrites a received database query, which indicates the common table, to generate a first rewritten database query to indicate the first virtual table instead of the common table and to generate a second rewritten database query to indicate the second virtual table instead of the common table, and
      generates a plurality of access plans that include at least a first access plan for the first rewritten database query and at least a second access plan for the second rewritten database query, wherein each of the plurality of access plans are for either the first rewritten database query or the second rewritten database query;
   a selecting section that selects one of the plurality of access plans generated by the generating section;
   a storing section that caches the plurality of access plans generated by the generating section;
   a managing section that,
      in response to being notified that the first data has become unavailable, disables those of a plurality of access plans generated for the first rewritten database query, and
      in response to being notified that the first data has become available, enables those of the plurality of access plans generated for the first rewritten database query; and
   a monitoring section that,
      monitors whether or not the first and second data are available,
      once the first data has become unavailable, notifies the managing section that the first data has become unavailable, and
      once the first data has become available, notifies the manage section that the first data has become available.

2. The system according to claim 1, further comprising an estimating section that estimates a cost of each of the plurality of access plans, wherein
the selecting section selects the one of the plurality of access plans based on the costs of the access plans estimated by the estimating section.

3. The system according to claim 1, further comprising an estimating section that estimates a cost of each of the plurality of access plans, wherein
the storing section further caches the costs of the plurality of access plans estimated by the estimating section.

4. The system according to claim 1, wherein the generating section determines that no access plan is cached in the storing section.

5. The system according to claim 1, further comprising an executing section that executes the one of the plurality of access plans selected by the selecting section to implement the received database query.

6. The system according to claim 1, further comprising a receiving section that receives the received database query sent from a client via a network.

7. The system according to claim 1,
wherein the managing section further, once a replica of the first data has newly been created, adds information indicating creation of the new replica to those of the plurality of access plans that were generated for the first rewritten database query.

8. A method comprising:
receiving a query for a federated database, wherein the query indicates a common table at a federated database system that manages the federated database;
using a dependency list to determine that a first virtual table and a second virtual table are associated with the common table and to determine names of the first virtual table and the second virtual table;
writing a first rewrite of the query to indicate the first virtual table instead of the common table;
generating a first access plan based on the first rewrite of the query;
writing a second rewrite of the query to indicate the second virtual table instead of the common table;
generating a second access plan based on the second rewrite of the query;
estimating a first cost of the first access plan;
estimating a second cost of the second access plan;
storing the first and second access plans along with the first and second costs;
selecting either the first access plan or the second access plan to execute the received query, wherein the first virtual table references a first actual table on a first database system and the second virtual table references a second actual table on a second database system
maintaining a status of the first and the second access plans, wherein the status of the first access plan corresponds to status of first database system and status of the second access plan corresponds to status of the second database system; and
setting status of the first access plan to disabled if the status of the first database system is unavailable.

9. The method of claim 8, wherein the first cost of the first access plan is based on at least one of response time to carry out the first access plan and amount of resources used to carry out the first access plan.

10. The method of claim 8, wherein said selecting is based, at least in part, on the first cost and the second cost.

11. A program product encoded in one or more machine-readable media, which when executed by a machine causes the machine to perform operations that comprise:
receiving a query for a federated database, wherein the query indicates a common table at a federated database system that manages the federated database;
using a dependency list to determine that a first virtual table and a second virtual table are associated with the common table and to determine names of the first virtual table and the second virtual table;
writing a first rewrite of the query to indicate the first virtual table instead of the common table;
generating a first access plan based on the first rewrite of the query;
writing a second rewrite of the query for the second virtual table;
generating a second access plan based on the second rewrite of the query;
estimating a first cost of the first access plan;
estimating a second cost of the second access plan;
storing the first and second access plans along with the first and second costs;
selecting either the first access plan or the second access plan to execute the received query
maintaining a status of the first and the second access plans, wherein the status of the first access plan corresponds to status of first database system and status of the second access plan corresponds to status of the second database system; and
setting status of the first access plan to disabled if the status of the first database system is unavailable.

12. The program product of claim 11, wherein the first cost of the first access plan is based on at least one of response time to carry out the first access plan and amount of resources used to carry out the first access plan.

* * * * *